United States Patent
Kato

(10) Patent No.: US 9,838,655 B2
(45) Date of Patent: Dec. 5, 2017

(54) PROJECTOR AND IMAGE DISPLAYING METHOD

(71) Applicant: NEC Display Solutions, Ltd., Tokyo (JP)

(72) Inventor: Atsushi Kato, Tokyo (JP)

(73) Assignee: NEC DISPLAY SOLUTIONS, LTD, Tokyo (JP)

( * ) Notice: Subject to any disclaimer, the term of this patent is extended or adjusted under 35 U.S.C. 154(b) by 0 days.

(21) Appl. No.: 15/104,519

(22) PCT Filed: Feb. 7, 2014

(86) PCT No.: PCT/JP2014/052863
§ 371 (c)(1),
(2) Date: Jun. 14, 2016

(87) PCT Pub. No.: WO2015/118651
PCT Pub. Date: Aug. 13, 2015

(65) Prior Publication Data
US 2016/0316182 A1    Oct. 27, 2016

(51) Int. Cl.
*H04N 9/31*    (2006.01)
*H04N 5/64*    (2006.01)
(Continued)

(52) U.S. Cl.
CPC .......... *H04N 9/3108* (2013.01); *G09G 3/002* (2013.01); *G09G 3/007* (2013.01); *G09G 3/346* (2013.01);
(Continued)

(58) Field of Classification Search
CPC .. H04N 9/3108; H04N 9/3111; H04N 9/3188; G09G 3/346; G09G 3/002;
(Continued)

(56) References Cited

U.S. PATENT DOCUMENTS 7,125,121 B2 * 10/2006 Miyagaki ............. H04N 9/3188
348/771
7,172,288 B2 * 2/2007 Pate ....................... G03B 21/00
345/30

(Continued)

FOREIGN PATENT DOCUMENTS

JP    H 04-113308 A    4/1992
JP    H 10-222133 A    8/1998
(Continued)

OTHER PUBLICATIONS

Chinese Office Action dated Mar. 22, 2017 (with Search Report) with an English translation thereof.
(Continued)

*Primary Examiner* — Trang U Tran
(74) *Attorney, Agent, or Firm* — McGinn IP Law Group, PLLC.

(57) ABSTRACT

A projector includes a DMD that forms an image, a projection lens that projects the image formed by the DMD on a projected surface, and a display control unit that controls an image forming operation of the DMD. The display control unit forms a frame image by sequentially forming a plurality of images using a combined pixel which is configured of a plurality of pixels, and with respect to temporally continuous two images, the display control unit forms one image at a position that is shifted by a distance that corresponds to the pixel pitch of the DMD in a predetermined direction relative to the other image.

12 Claims, 9 Drawing Sheets

(51) Int. Cl.
  *G09G 3/00* (2006.01)
  *G09G 3/34* (2006.01)
  *G03B 21/14* (2006.01)
  *G03B 21/00* (2006.01)
  *G09G 3/20* (2006.01)

(52) U.S. Cl.
  CPC ......... *H04N 9/3111* (2013.01); *H04N 9/3188* (2013.01); *G03B 21/005* (2013.01); *G03B 21/14* (2013.01); *G09G 3/2025* (2013.01); *G09G 2310/0235* (2013.01); *G09G 2340/04* (2013.01); *G09G 2340/0407* (2013.01); *G09G 2340/0457* (2013.01)

(58) Field of Classification Search
  CPC ......... G09G 2340/04; G09G 234/0407; G03B 21/005; G03B 21/14
  USPC ................ 348/742–744, 739; 353/31, 30, 84
  See application file for complete search history.

(56) References Cited

U.S. PATENT DOCUMENTS

| | | | |
|---|---|---|---|
| 7,182,463 B2* | 2/2007 | Conner | H04N 9/3188 348/E9.027 |
| 7,358,930 B2* | 4/2008 | Childers | H04N 9/3188 345/32 |
| 9,456,207 B2 | 9/2016 | Abe et al. | |
| 2005/0024593 A1 | 2/2005 | Pate et al. | |
| 2005/0068344 A1 | 3/2005 | Kurumisawa | |
| 2005/0093894 A1 | 5/2005 | Tretter et al. | |
| 2006/0023003 A1 | 2/2006 | Yamanaka | |
| 2009/0262267 A1 | 10/2009 | Kameyama et al. | |
| 2010/0253921 A1 | 10/2010 | Nagai | |
| 2014/0340492 A1 | 11/2014 | Abe et al. | |

FOREIGN PATENT DOCUMENTS

| | | |
|---|---|---|
| JP | 2002-174852 A | 6/2002 |
| JP | 2005-084516 A | 3/2005 |
| JP | 2007-510186 A | 4/2007 |
| JP | 2008-076746 A | 4/2008 |
| JP | 2009-258359 A | 11/2009 |
| JP | 2015-005974 A | 1/2015 |

OTHER PUBLICATIONS

International Search Report (ISR) (PCT Form PCT/ISA/210), in PCT/JP2014/052863, dated Mar. 18, 2014.

Notice of "Decision to Grant a Patent" dated Jun. 6, 2017 in the Japanese counterpart Application No. 2015-561109, with an English translation of the reference information thereof.

Extended European Search Report dated Sep. 8, 2017 in the European Patent Application No. 14882106.9.

* cited by examiner

Full HD Horizontal 1920 pixels ×
Vertical 1080 pixels

4K × 2K Horizontal 3840 pixels ×
Vertical 2160 pixels

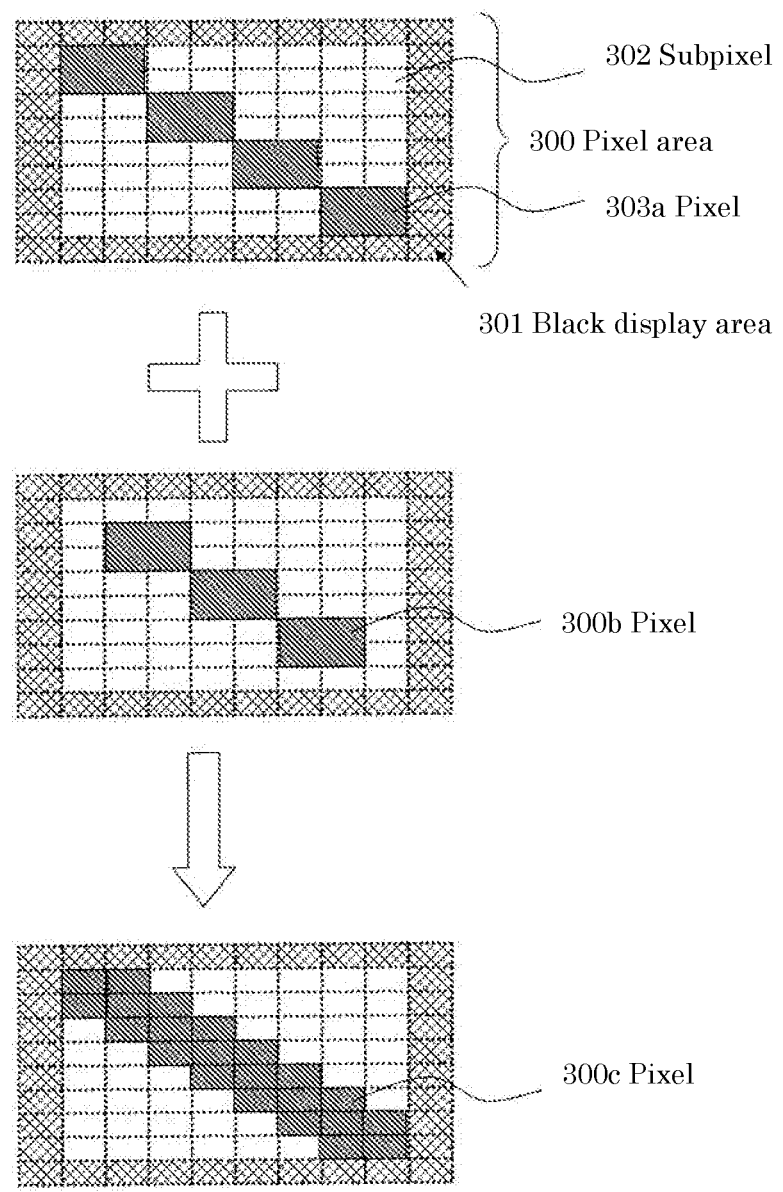

PROJECTOR AND IMAGE DISPLAYING METHOD

TECHNICAL FIELD

The present invention relates to a projector that includes a display panel such as a digital micromirror device (DMD), liquid crystal panel or the like and that enlarges and projects images formed by the display panel.

BACKGROUND ART

Concerning display panels for projectors, the technologies have made rapid progress due to market demands, design improvements, improved manufacturing methods or the like, and because of pixel micronization, display panels that feature high definition and miniaturization have been developed.

Among recent projectors, projectors having high-definition display panels such as, for example 4K-compatible projectors have also appeared. Herein, the 4K-compatible projector is a projector that includes a display panel having a pixel count of 4K×2K (e.g., 3, 840×2, 160 pixels or 4,096×2, 160 pixels).

On the other hand, technologies have been proposed that can increase the number of pixels on the projected image without using high-definition display panels.

For example, Patent Document 1 discloses a projection display device that can produce a projected image whose number of pixels is twice as many number of pixels of the display panel.

The projection display device according to Patent Document 1 includes: a liquid crystal panel for display; a projection optical system for enlarging and projecting the image formed by the liquid crystal panel on a screen; a driving voltage generator; and a shifting means which is made up of a liquid crystal panel for polarization direction control and a quartz plate, arranged between the liquid crystal panel for display and the projection optical system and driven by the driving voltage supplied from the driving voltage generator.

The shifting means is one that shifts the optical path by use of the double refraction phenomenon of a quartz plate. Specifically, among the light that vertically enters the quartz plate, light of the first polarization (normal light) passes as it is through the quartz plate without being refracted, so that the incident optical path coincides with the exiting optical path. On the other hand, light of the second polarization (abnormal light) is refracted by the quartz plate, so that the exiting optical path is shifted relative to the incident optical path. This relationship between the normal light and the abnormal light is used to control optical path shifting.

The liquid crystal panel for display supplies light of the first polarization to the liquid crystal panel for polarization direction control.

In a state in which a driving voltage is supplied to the liquid crystal panel for polarization control, light of the first polarization passes as it is through the liquid crystal panel for polarization control and enters the quartz plate. In this case, no shifting of the optical path takes place.

On the other hand, in a state in which no driving voltage is supplied to the liquid crystal panel for polarization control, light of the first polarization passes through the liquid crystal panel for polarization control, but the polarization of light is rotated 90 degrees as the light passes therethrough. As a result, the light that passed through the liquid crystal panel for polarization control becomes light of the second polarization and then enters the quartz plate. In this case, a shift of the optical path takes place.

The original image having twice the number of pixels of the liquid crystal panel for display is decomposed into two images I1 and I2 by thinning out every other pixels in the horizontal direction, whereby images I1 and I2 are displayed by the liquid crystal panel for display in a time-divisional manner. In a period during which image I1 is displayed, the driving voltage is supplied to the liquid crystal panel for polarization control, whereas in a period during which image I2 is displayed, supply of the driving voltage to the liquid crystal panel for polarization control is suspended.

On the screen, the projected image of image I1 and the projected image of image I2 are displayed in a time-divisional manner. The projected image of image I2 is displayed at the position shifted in the horizontal direction by ½ pixel pitch relative to the projected image of image I1. By setting display cycle of images I1 and I2 shorter than the afterimage duration of the human eyes, the superimposed image of the projected images of images I1 and I2 can be observed. This observed image (the superimposed image of images I1 and I2) has a pixel count equivalent to that of the original image.

RELATED ART DOCUMENTS

Patent Documents

Patent Document 1: JPO4-113308A

Disclosure of the Invention

The above-described projector having a high-definition display panel entails the following problems.

Generally, the projection lens of a projector is designed so that the MTF (Modulation Transfer Function) value that represents the performance of the lens is equal to or greater than 50% of the spatial frequency (e.g., the spatial frequency for black and white display) that is determined by the size of the pixels on the display panel. This is because if a projection lens whose MTF value is less than 50% of the spatial frequency of the display panel is used, the resolving power of the projection lens is insufficient compared to the resolution of the image formed by the display panel, causing image degradation of the projected image. Here, the spatial frequency indicates the number of line pairs that can be arranged per 1 mm, and the unit is lp/mm (line pair per millimeter). Since the greater the spatial frequency the thinner is the line width, the resolution becomes higher.

Therefore, if a high-definition display panel is used, it is necessary to employ a projection lens that has a resolving power according to the resolution of the display panel.

However, if the spatial frequency of the display panel is higher, it is necessary, for example, to use expensive lenses having less aberration and/or increase the number lenses necessary for aberration correction in order to fulfill the condition in which the MTF value is equal to or greater than 50% of the spatial frequency. As a result, use of a high-definition display panel leads to an increase in size of the projection lens, and also causes cost increases.

Further, it is also anticipated in the future that the pixels of display panels will be further micronized, hence it may become difficult to satisfy the condition in which the MTF value is equal to or greater than 50%, as a result of increase in spatial frequency.

In the projection display device described in Patent Document 1, since it is possible to provide a projected image whose number of pixel is twice as many number of pixels of the display panel without changing the pixel size of the display panel, an increase in the size and cost of the projection lens can be prevented compared to the aforementioned projector having a high-definition display panel.

However, since the projection display device described in Patent Document 1 needs to be equipped with a shifting means in the optical path, this gives rise to problems of an increase in the size and cost of the device.

The object of the present invention is to solve the above problems and to provide a projector and image displaying method that can provide a high-definition projected image by means of a projection lens that does not have a sufficiently high MTF value compared to the spatial frequency of the display panel.

In order to achieve the above object, a projector of the present invention includes: a light source; image forming means that includes a pixel area which is configured of a plurality of pixels, the plurality of pixels modulating light that is emitted from the light source based on an input video signal to form an image; projecting means that projects the image that is formed by the image forming means; and control means that controls an image forming operation of the image forming means. The control means forms a frame image by sequentially forming a plurality of images in which a combined pixel which is configured of a plurality of pixels is used as a pixel unit, and with respect to temporally continuous two images from among the plurality of images, the control means forms one image at a position that is shifted by a distance that corresponds to a pixel pitch of the pixel area in a predetermined direction relative to the other image.

The image displaying method of the present invention is An image displaying method implemented in a projector that includes a display panel, that forms an image by modulating light emitted from a light source based on an input video signal, and that projects an image that is formed by the display panel to a projected surface, the image displaying method including: displaying a frame image by sequentially forming, by the display panel, a plurality of images in which a combined pixel which is configured of a plurality of pixels is used as a pixel unit; and with respect to temporally continuous two images from among the plurality of images, forming one image at a position that is shifted by a distance that corresponds to a pixel pitch of the display panel in a predetermined direction relative to the other image.

BRIEF DESCRIPTION OF THE DRAWINGS

FIG. 8A A schematic diagram showing one example of an image forming area in an image formed on a time division basis in the projector shown in FIG. 1.

Figure 1:
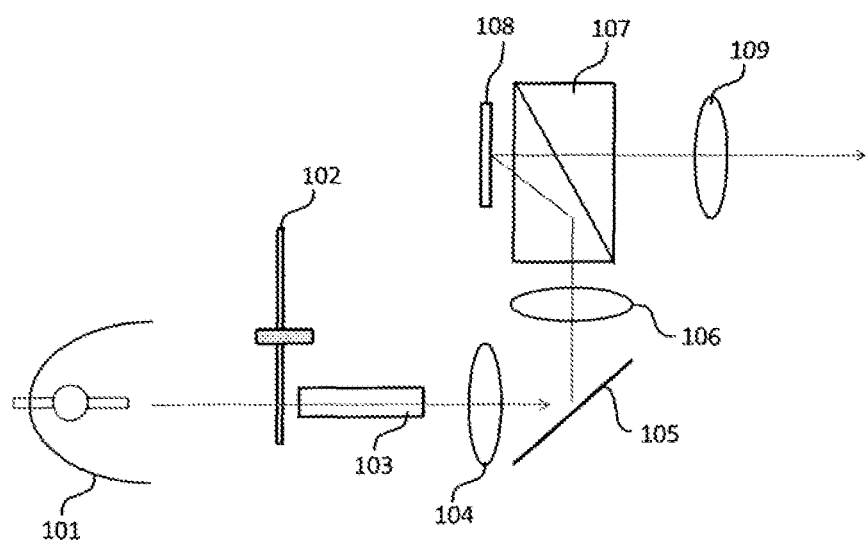
FIG. 1 A schematic diagram showing components relating to an optical system of a projector according to an exemplary embodiment of the present invention.

DESCRIPTION OF REFERENCE NUMERALS 1 display control unit
2 panel driver
4 wheel driver
101 light source
102 color wheel
103 Uniforming element
104, 106 lenses
105 mirror
107 TIR prism
108 DMD
109 projection lens

THE BEST MODE FOR CARRYING OUT THE INVENTION

Next, the exemplary embodiment of the present invention will be described with reference to the drawings.

FIG. 1 is a schematic diagram showing components relating to an optical system of a projector according to an exemplary embodiment of the present invention.

Referring to FIG. 1, the projector includes light source 101, color wheel 102, uniforming element 103, lenses 104, 106, mirror 105, TIR (Total Internal Reflection) prism 107, digital micromirror device (DMD) 108 and projection lens 109.

Light source 101 is a white light source such as, for example a white color discharge lamp or the like. Light source 101 is configured to emit converging light.

Uniforming element 103 is formed of a light element such as a light tunnel, rod integrator or the like, having an incident surface at one end face and an outgoing surface at the other end face. White light (converging light) from light source 101 enters the incident surface of uniforming element 103. A fly-eye lens may be used instead of a light tunnel or the like.

Color wheel 102 is arranged near the incident end of uniforming element 103. Color wheel 102 includes a wheel, in which a filter R having characteristics of transmitting a wavelength range of red (R) light, a filter G having characteristics of transmitting a wavelength range of green (G) light and a filter B having characteristics of transmitting a wavelength range of blue (B) light are arranged in a predetermined order in the circumferential direction, and the center of the wheel is supported by a rotational shaft of a motor. Rotation of the wheel enables emission of red light, green light and blue light in a time-divisional manner. Here, the number of filters R, G and B and the dimension of each filter in the circumferential direction can be set as appropriate.

Arranged on the outgoing end side of uniforming element 103 are lens 104, mirror 105 and lens 106 in this order as a means of deflecting the optical path. TIR prism 107 is arranged on the deflected optical path.

TIR prism 107 is a total reflection prism assembly that is formed of first and second right angle prisms and has a total reflection surface therein. The first and second right angle prisms each have first and second faces that form the legs of the right triangle and a third face that form the hypotenuse, and are arranged so that their third faces are opposite to each other.

The first face of the first right angle prism forms the incident surface of TIR prism 107 while DMD 108 is arranged so as to be opposite to the second face of the first right angle prism. The second face of the second right angle prism forms the outgoing surface of TIR prism 107 while projection lens 109 is arranged on the outgoing surface side.

Light emitted from the outgoing end of uniforming element 103 sequentially passes through lens 104, mirror 105 and lens 106 to enter the incident surface of TIR prism 107. Light incident on TIR prism 107 is totally reflected by the interior total reflection surface and is then emitted from the second face of the first right angle prism. The light emitted from the second face is made to irradiate DMD 108.

Uniforming element 103 is used to make uniform the illumination distribution on the cross section of the flux of light irradiated on DMD 108. Illumination information that is in the shape of a square and in which the illumination distribution is uniform is formed near the exit end of uniforming element 103. This square illumination information is image-formed on DMD 108 by way of lens 104, mirror 105, lens 106 and TIR prism 107.

DMD 108, which is a display panel, includes a plurality of micromirrors. Each micromirror is configured so as to change its angle in accordance with driving voltage, thus making the angle of reflection different between a state in which the driving voltage in the ON-state is applied and a state in which the driving voltage in the OFF-state is applied. Each micromirror is on/off controlled in accordance with image signals whereby the flux of incident light is spatially modulated to form images.

The image formed by DMD 108 passes through TIR prism 107 and is enlarged and projected on an unillustrated screen by projection lens 109.

Next description will be made on components relating to display operation of the projector of the present exemplary embodiment.

Figure 2:
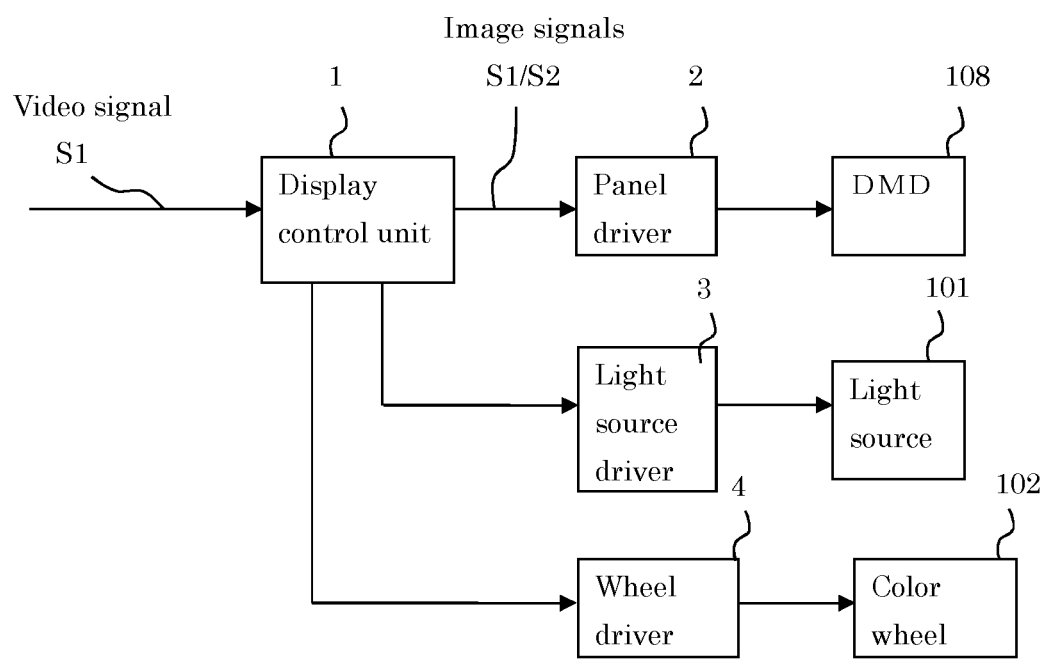
FIG. 2 A block diagram showing a schematic configuration of components relating to display operation of a projector according to an exemplary embodiment of the present invention.

FIG. 2 is a block diagram showing a schematic configuration of components relating to display operation.

Referring to FIG. 2, the projector includes panel driver 2 for driving DMD 108, light source driver 3 for driving light source 101, wheel driver 4 for driving color wheel 102, and display control unit 1 that operates these panel driver 2, light source driver 3 and wheel driver 4 to perform display control.

Display control unit 1 receives video signal S1 from an external device. Display control unit 1 operates panel driver 2 so that images in accordance with input video signal S1 are formed by DMD 108 and operates light source driver 3 and wheel driver 4 in synchronization with the image forming operation.

The external device is, for example, a personal computer or a video device such as recorder. The synchronizing signals for synchronizing the image forming operation of DMD 108 with the operations of light source driver 3 and wheel driver 4 may be contained in video signal S1, or may be supplied from an external device, separately from video signal S1.

Display control unit 1 controls the image forming operation of DMD 108 by a technique called pixel shifting method. In this image forming operation, display control unit 1 uses a combined pixel which is composed of a plurality of pixels as the pixel unit (the pixel unit for projected images) to sequentially form multiple images, and thereby forms frame images. Regarding temporally continuous two images from among these images, display control unit 1 forms one image at the position that is shifted by the distance corresponding to the pixel pitch of DMD 108 in a predetermined direction relative to the other image.

For example, display control unit 1 handles the pixels of the image formed by individual micromirrors of DMD 108 as subpixels, makes DMD 108 form multiple images, in which a pixel (the aforementioned combined pixel) is composed of a plurality of subpixels, in a time-divisional manner to form frame images, and performs control such that the image forming area of one image is shifted from that of another by one subpixel unit (the pixel pitch of DMD 108) in the predetermined direction.

Now, pixel-shifting control will be specifically described.

Display control unit 1 generates image signals S2 and S3 representing images to be formed in a time-divisional manner, from video signal S1. Image signals S2 and S3 each have 1/n of the resolution of video signal S1. Here, n is the number of subpixels that form one pixel of the image to be formed in a time-divisional manner.

For example, when DMD 108 is a 4K-compatible panel having a resolution of 3,840 (horizontal)×2,160 (vertical) while one pixel of the image to be formed in a time-divisional manner is composed of 2×2 subpixels, and when a signal that represents an image having a resolution of 3,840 (horizontal)×2,160 (vertical) is supplied as video signal S1, image signals S2 and S3 each become a signal that represents an image having a resolution of 1,920 (horizontal)×1,080 (vertical). In this case, in image signals S2 and S3, the signal (data) for a pixel is commonly assigned to the 2×2 subpixels that form the pixel.

Display control unit 1 divides one frame of video signal S1 into the first and second subframes, supplies image signal S2 to panel driver 2 during the first subframe period, and supplies image signal S3 to panel driver 2 during the second subframe period.

More specifically, display control unit 1 divides an image field, which is the time unit for displaying the image of one frame of video signal S1, into the first and second subfields and generates image signals S2 and S3 in accordance with the first and second subfields, respectively and supplies them to panel driver 2.

In the period of the first subframe (or the first subfield), panel driver 2 makes DMD 108 form an image based on image signal S2. In the period of the second subframe (or the second subfield), panel driver 2 makes DMD 108 form an image based on image signal S3.

Figure 3A:
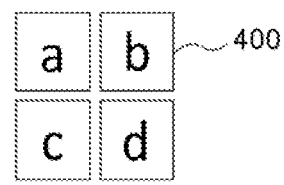
FIG. 3A A schematic diagram showing partial pixels of the DMD of the projector shown in FIG. 1.
Figure 3B:
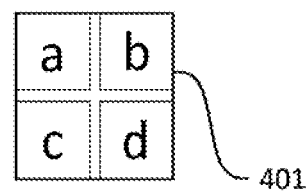
FIG. 3B A schematic diagram showing a partial pixel of the image formed by the DMD of the projector shown in FIG. 1.

When one pixel of the image to be formed in a time-divisional manner is composed of 2×2 subpixels, each of 2×2 pixels a to d of DMD 108 is regarded as subpixel 400 as shown in FIG. 3A and one pixel 401 of the image to be formed in a time-divisional manner is composed of four subpixels 400 as shown FIG. 3B.

Further, the image based on image signal S2 and the image based on image signal S3 are formed such that the image forming area of each image is shifted by one subpixel unit in a predetermined direction from the other.

Figure 4A:
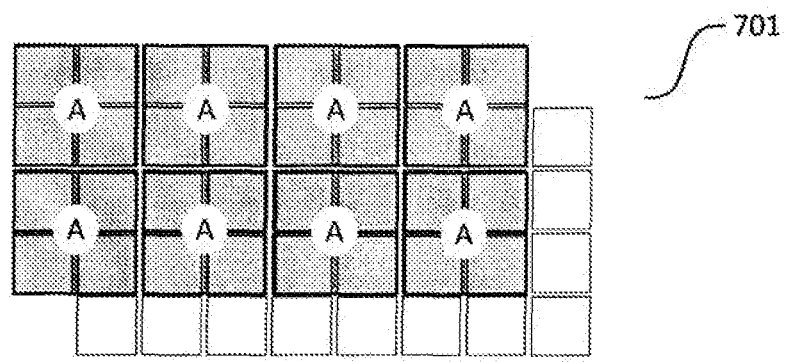
FIG. 4A A schematic diagram showing an image forming area of an image formed by the DMD of the projector shown in FIG. 1.
Figure 4B:
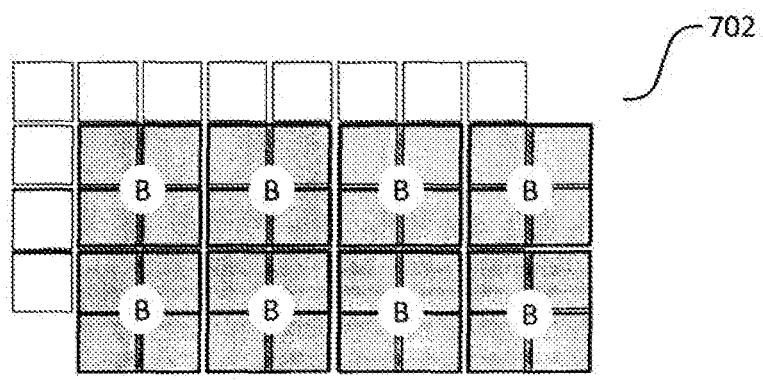
FIG. 4B A schematic diagram showing another image forming area of an image formed by the DMD of the projector shown in FIG. 1.

FIG. 4A shows image forming area 701 that forms part of image A based on image signal S2 whereas FIG. 4B shows image forming area 702 that forms part of image B based on image signal S3.

As shown in FIGS. 4A and 4B, image forming area 702 is shifted by one subpixel unit in both the vertical direction (column direction) and horizontal direction (row direction) relative to image forming area 701. That is, image forming area 702 is shifted to the lower right relative to image forming area 701. Here, the lower right means the direction of the diagonal line of pixel 401 shown in FIG. 3B (the direction in which subpixels a and b are arranged).

According to the above-described pixel-shifting control, though image A based on image signal S2 and image B based on image signal S3 are displayed by time division on the projected surface, the superimposed image of image A and image B is observed due to the afterimage effect on human eyes.

Further, as shown in FIGS. 3A and 3B, each pixel of images A and B is composed of 2×2 subpixels, and the image forming areas of images A and B are shifted by one subpixel unit in the vertical and horizontal directions from each other, as shown in FIGS. 4A and 4B. As a result, on the projected surface, the corresponding pixels of images A and B form respective images that are shifted from each other by 0.5 pixel (1 subpixel) unit in the vertical and horizontal directions. In this case, the superimposed image of image A and image B will be observed as an image having a pixel count equivalent to the number of subpixels of DMD 108, hence it is practically possible to provide an image having a pixel count equivalent to the pixel count of DMD 108, i.e., 3,840 (horizontal)×2,160 (vertical).

In order to positively increase the pixel count of the projected image by the above-described pixel-shifting control, display control unit 1 may generate image signals S2 and S3 so that the content (e.g., luminance value) is different between image A and image B.

For example, display control unit 1 performs a process, in which the average of data (e.g., luminance value) of four subpixels 400 shown in FIG. 3A is calculated and the average value is set to the data for pixel 401 shown in FIG. 3B, for all the subpixels of the image based on video signal S1 to generate image signal S2. Further, display control unit 1 weights each pixel 401 of the image based on image signal S2 to generate image signal S3.

However, the method of generating image signals S2 and S3 should not be limited to the above technique. Image signals S2 and S3 may be generated by any other method as long as data of corresponding pixels can be made different from each other. For example, image signals S2 and S3 may be generated from video signal S1 by thinning out pixels. Alternatively, the combination of four subpixels for average calculation may be different between image signal S2 and image signal S3.

Here, in this exemplary embodiment, video signal R that represents red images, video signal G that represents green images and video signal B that represents blue images are supplied to display control unit 1 in a time-divisional manner as video signal S1. Display control unit 1 performs the image forming process according to the above-described pixel shifting control for each of video signals R, G and B.

According to the projector of the present exemplary embodiment described above, the following operation and effect can be obtained.

When video signal S1 that represents images having the same resolution as DMD 108 is input and when the image based on video signal S1 is formed, as it is, by DMD 108, unless the MTF value of projection lens 109 is equal to or greater than 50% of the spatial frequency of DMD 108, there is a risk that the image quality of the projected image degrades due to deficiency of the resolution of projection lens 109 compared to the image formed by DMD 108.

In the projector of the present exemplary embodiment, the image based on video signal S1 is not formed by DMD 108 without change, but multiple images each having the resolution that is 1/n (n is the number of subpixels forming a whole pixel of the image to be formed by time division) as larger as the resolution of video signal S1 are formed by DMD 108 in a time-divisional manner according to the above-described pixel shifting control.

Figure 5:
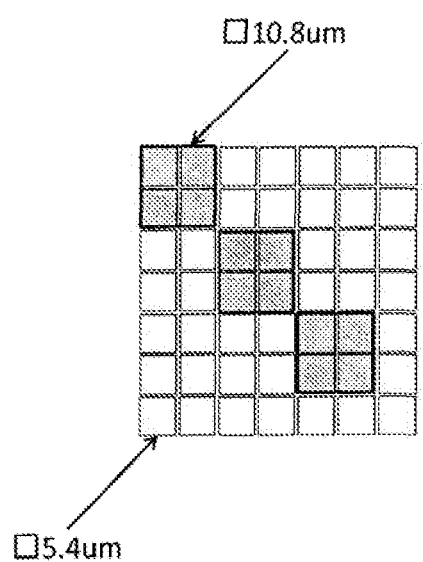
FIG. 5 A schematic diagram for illustrating pixels of an image formed by the DMD of the projection shown in FIG. 1.

For example, in the case where one pixel of the image that is formed in a time-divisional manner is composed of 2×2 subpixels as shown in FIGS. 3A and 3B, one subpixel has a size of 5.4 µm but one pixel (combined pixel) of the image that is formed in a time-divisional manner has a size of 10.8 µm as shown in FIG. 5. Thus, the size of the pixel is two times as large as that of the subpixel in both horizontal and vertical directions.

In the above case, if the spatial frequency of DMD 108 is N (lp/mm), the spatial frequency of the image that is formed in a time-divisional manner is 0.5 N (lp/mm) In this case, the resolving power required for the image to be formed by time division is reduced to half compared to the resolving power required for DMD 108. Accordingly, even if the MTF value of projection lens 109 is less than 50% of the spatial frequency of DMD 108, the resolving power of the projection lens will not be insufficient compared to the formed image as long as the MTF value is equal to or greater than 50% of the spatial frequency that is determined based on the size of the pixel of the image that is formed in a time-divisional manner.

Further, the frame image is formed by using a plurality of images that are formed in a time-divisional manner, and the pixel of each image (the combined pixel used to form the image) is configured such that the frame image will be formed in subpixel units. Specifically, the forming areas of the pixels (combined pixels used to form the images) corresponding to each other between the images, that are temporally and continuously formed, are shifted by one pixel unit in the predetermined direction. Therefore, when the projected images are observed, it is possible to provide a high-definition image having a pixel count equivalent to that of DMD 108 as the image being watched (the frame image or the superimposed image of the successive images).

As described above, according to the projector of the present exemplary embodiment, when a high-definition display panel is used as DMD 108, since a projection lens having an MTF value of less than 50% of the spatial frequency of the panel can be used, it is possible to prevent an increase in the size and cost of the projection lens.

Since the dimensions of the high-definition display panel are not changed, there is no need to change the optical system including the projection lens. Thus, it is hence possible to prevent an increase in the size and cost of the optical system.

Next, the operation and effect of the projector of the present exemplary embodiment will be detailed by giving specific examples.

Figure 6A:
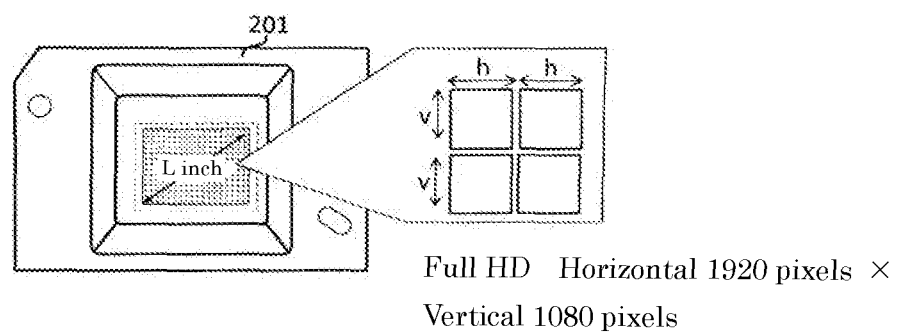
FIG. 6A A schematic diagram showing one example of a full-HD supporting DMD used as the DMD of the projector shown in FIG. 1.
Figure 6B:
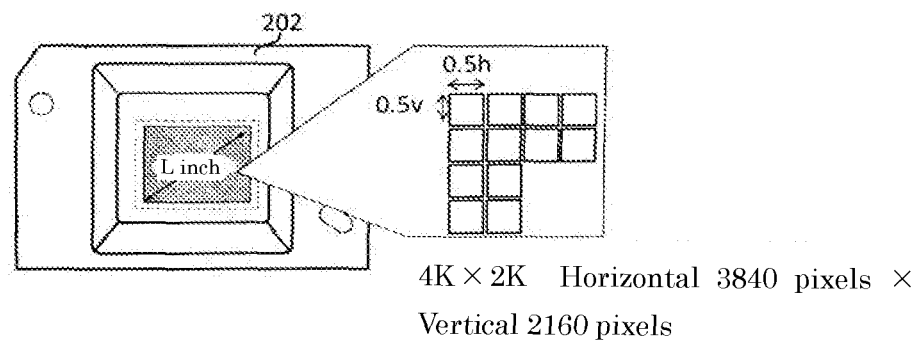
FIG. 6B A schematic diagram showing one example of a 4K-compatible DMD used as the DMD of the projector shown in FIG. 1.

In a projector that includes DMD 201 that supports full HD (Full High definition) shown in FIG. 6A, a case of using 4K-compatible DMD 202 shown in FIG. 6B instead of DMD 201 will be considered.

Full-HD supporting DMD 201 has an image forming area with a pixel count of 1,920(horizontal)×1,080(vertical). The diagonal dimension of the image forming area is L inches and one pixel size is V(vertical)× h(horizontal).

On the other hand, 4K-compatible DMD 202 has an image forming area with a pixel count of 3,840(horizontal)× 2,160(vertical). The diagonal dimension of the image forming area is L inches, which is the same as that of full HD supporting DMD 201. One pixel size is 0.5V(vertical)×0.5 h(horizontal), quarter of the pixel size of the full HD supporting DMD 201.

In the above situation, if full HD supporting DMD 201 is replaced with 4K-compatible DMD 202, the spatial frequency of DMD increases. For example, when h=v=10.8 µm, the spatial frequency of full HD supporting DMD 201 is 46.3 lp/mm (line pair per millimeter), whereas the spatial frequency of 4K-compatible DMD 202 is 92.6 lp/mm Since the spatial frequency of 4K-compatible DMD 202 is twice the spatial frequency of full HD supporting DMD 201, if the projection lens used for full HD supporting DMD 201 is used without change, the resolving power of the projection lens will be insufficient for the image formed by 4K-compatible DMD 202, causing degradation of the image.

Figure 7:
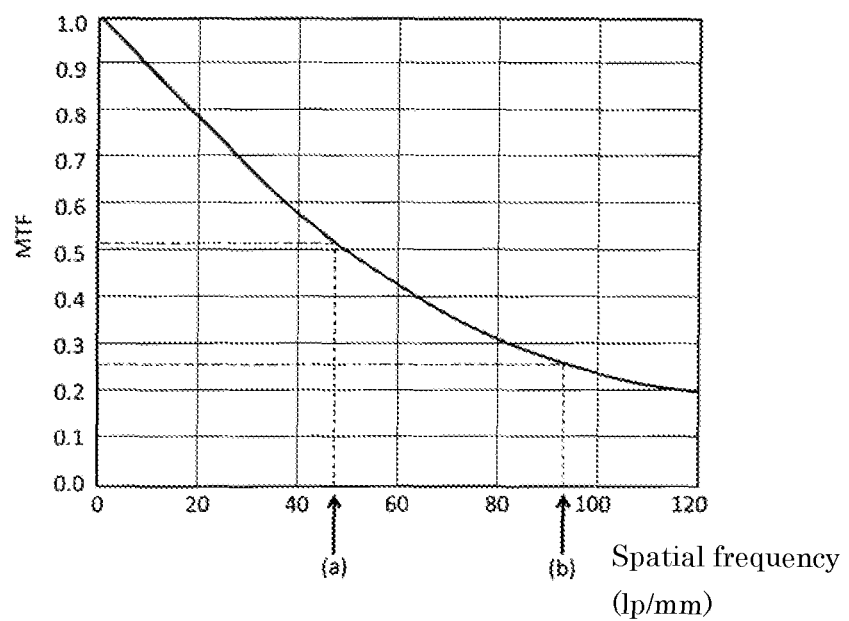
FIG. 7 A characteristic chart showing MTF characteristics of a projection lens used for the DMD shown in FIG. 6A.

FIG. 7 shows the MTF characteristics of the projection lens used for full HD supporting DMD 201. The horizontal axis represents spatial frequency; and the vertical axis represents the MTF value. The MTF value indicates how faithfully the contrast of the projected image can be reproduced by frequency characteristics.

In the MTF characteristics of FIG. 7, the values of spatial frequency at points (a) and (b) on the horizontal axis are 46.3 lp/mm and 92.6 lp/mm, respectively. Since the MTF value for the spatial frequency of 46.3 lp/mm is greater than 50%, the resolving power is not insufficient. However, since the MTF value for the spatial frequency of 92.6 lp/mm is significantly lower than 50%, the resolving power is insufficient.

In the projector of the present exemplary embodiment, it is possible to solve the above insufficiency problem of the resolving power of the projection lens by performing the above-described pixel-shifting control.

Specifically, display control unit 1 handles individual pixels of 4K-compatible DMD 202 as subpixels, and generates image signals S2 and S3 from video signal S1 having a resolution of 3,840 (horizontal)×2,160 (vertical). Here, both image A of image signal S2 and image B of image signal S3 are an image in which one pixel is composed of 2×2 subpixels, or an image having a pixel count of 1,920 (horizontal)×1,080 (vertical).

Display control unit 1 causes 4K-compatible DMD 202 to form image A and image B in time-divisional manner while shifting the image forming area of image B relative to the image forming area of image A by one subpixel unit in both the vertical and horizontal directions. As a result, the observed image (the superimposed image of images A and B) on the projected surface results in an image having a pixel count of 3,840 (horizontal)×2,160 (vertical).

In the above case, since projection lens 109 projects images A and B having a pixel count of 1,920 (horizontal)× 1,080 (vertical), no insufficient resolving power will occur if the MTF value is equal to or greater than 50% of the spatial frequency determined by the size of the pixels of images A and B. In this case, since the spatial frequency determined by the size of the pixels of images A and B is equal to 46.3 lp/mm or the spatial frequency of full HD supporting DMD 201, if the projection lens that was used for full HD supporting DMD 201 is used, no insufficient resolving power will occur.

Since the diagonal dimension of 4K-compatible DMD 202 is the same as that of full HD supporting DMD 201, there is no need to modify the optical system including the projection lens.

Although, in the above description, attention has been focused on resolution, which is the factor that most significantly affects the image quality of the projected image, there is another important factor, i.e., the convergence (pixel deviation) of the projected image. As conditions with respect to the pixel deviation, generally, the amount of pixel deviation between two colors among three RGB colors is regulated within 0.5 pixel. This corresponds to the characteristics of chromatic aberration of magnification in terms of projection lens specifications. Similarly to resolution, optimizing pixel deviation to conform with the pixel size of the display panel is carried out.

For example, in a full-HD projector, if the pixel size is "□10.8 µm" (this means 10.8 µm×10.8 µm), the projection lens is designed to satisfy the condition in which the pixel deviation is equal to or less than 5.4 µm that corresponds to 0.5 pixel unit. When this projection lens is used for the 4K-compatible display panel, only 2.7 µm is permitted as the chromatic aberration of magnification corresponding to the amount of deviation of 0.5 pixel for the pixel size "□5.4 µm" (this means 5.4 µm×5.4 µm). This correction of chromatic aberration of magnification leads to the problem of increase in size and cost of the projection lens.

According to the projector of the present exemplary embodiment, since, for example the pixel size of the image formed by a DMD can be made to be twice the value of the pixel size of the DMD (□10.8 µm) by using the pixel-shifting control, it is possible to prevent an increase in the size and cost of the above projection lens.

The projector described above is an exemplary embodiment of the present invention, and various modifications can be made to the structures and operations of the exemplary embodiment.

For example, DMD 108 has a pixel area which is composed of a plurality of pixels and part of the pixel area may be a black display area for displaying black (e.g., the area corresponding to the frame). In this case, display control unit 1 may be adapted to form multiple images in the pixel area other than black display area in time-divisional manner.

For example, as shown in FIG. 8A, DMD 108 has pixel area 300 which is composed of multiple subpixels 302, and the outer peripheral part of pixel area 300 is black display area 301.

During the period of the first subframe, display control unit 1 forms the first image in the area other than black display area 301 of pixel area 300. In this example, an image in which four pixels 303a are laid from the top left to the bottom right is formed as the first image.

Then, during the period of the second subframe, display control unit 1 forms the second image in the area other than black display area 301 of pixel area 300. In this example, an image in which three pixels 303b laid from the top left to the bottom right is formed as the second image. These three pixels 303b correspond to the three pixels 300a from the top left in the first image, and each pixel 303b is formed at the position shifted rightward and downward by one subpixel unit relative to the corresponding pixel 303a. Here, since the pixel that corresponds to the rightmost and lowermost pixel 303a partially overlaps black display area 301 in the second image, the pixel in question is deleted (not displayed).

The superimposed image of the above first image and second image is formed to accommodate the interior of the area other than black display area 301 of pixel area 300. This superimposed image corresponds to the image which is made up of 22 pixels 300c.

As another image forming technique, display control unit 1 may be adapted to form multiple images using area other than black display area of the pixel area in a time-divisional manner.

Figure 8B:
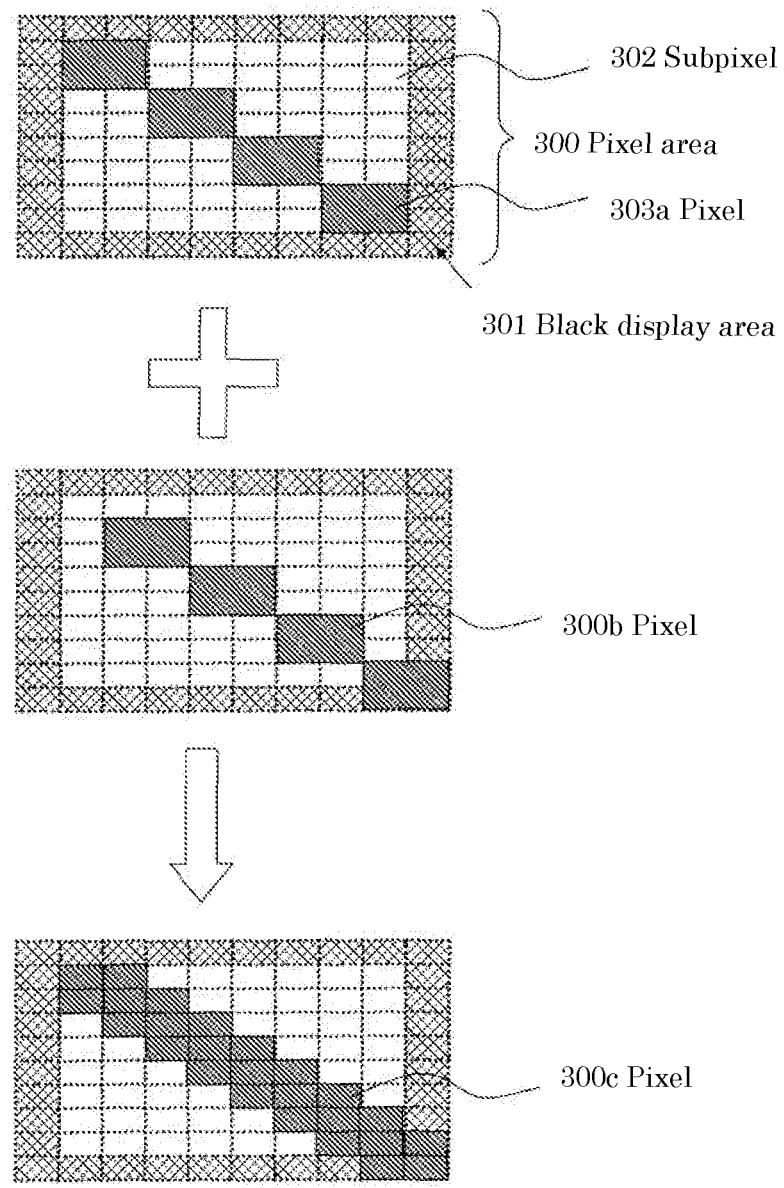
FIG. 8B A schematic diagram showing another example of an image forming area in an image formed on a time division basis in the projector shown in FIG. 1.

For example, as shown in FIG. 8B, during the period of the first subframe, display control unit 1 forms the first image in pixel area 300. In this example, an image in which four pixels 303a are laid from the top left to the bottom right is formed as the first image.

Then, during the period of the second subframe, display control unit 1 forms the second image in the area including black display area 301 of pixel area 300. In this example, an image in which four pixels 303b are laid from the top left to the bottom right is formed as the second image. The bottom right pixel 303b is located in black displaying area 301. Four pixels 303b correspond to the four pixels 303a in the first image, respectively, and each pixel 303b is formed at the position shifted rightward and downward by one subpixel unit relative to the corresponding pixel 303a.

The superimposed image of the above first image and second image is formed so as to accommodate the interior of pixel area 300. This superimposed image corresponds to the image made up of 25 pixels 300c.

Further, in the projector of the present exemplary embodiment, the image to be formed in a time-divisional manner may and should be an image in which one pixel is composed of a plurality of subpixels that are arranged in n(row)×m (column). Herein, n and m are positive integers (except the case where n=1 and m=1). In this case, the pixel may take various forms such as 1×2, 2×1, 2×2, 3×3, and so on.

For example, when the first and second images, in which one pixel is composed of two subpixels that are arranged in two rows and one column, are formed in a time-divisional manner, the image forming areas of the first and second images are shifted from each other by one subpixel in the row direction. In this case, the observed image results in an image in which the number of pixels is doubled in the row direction.

When the first and second images, in which one pixel is composed of two subpixels that are arranged in one row and two columns, are formed in a time-divisional manner, the image forming areas of the first and second images are shifted from each other by one subpixel in the column direction. In this case, the observed image results in an image in which the number of pixels is doubled in the column direction.

When the images, in which one pixel is composed of nine subpixels that are arranged in three rows and three columns, are formed in a time-divisional manner, the first to third image signals that represent the first to third images are generated. Further, one frame is divided into the first to third subframes (or subfields). Then, during the period of the first subframe, the first image based on the first image signal is formed, during the period of the second subframe, the second image based on the second image signal is formed, and during the period of the third subframe, the third image based on the third image signal is formed. In this case, the image forming areas of the first and second images are shifted from each other by one subpixel unit in the row and column directions. Further, the image forming areas of the second and third images are shifted from each other by one subpixel unit in the row and column directions. This makes it possible to increase the pixel count of the observed image compared to the configuration where one pixel is formed of four subpixels that are arranged in two rows and two columns, hence provide a high-definition image. In addition, since the pixel size of the images to be formed in a time-divisional manner becomes greater, the condition on the MTF value of the projection lens can be further alleviated.

Although the present exemplary embodiment has been described by referring to a single plate type projector equipped with a DMD as a display panel, the present invention should not be limited to this. The present invention can be applied to, for example a three-plate type projector, other than single plate type projectors.

Further, other than DMDs, liquid crystal panels and the like may be used as the display panel. As the liquid crystal panel, high-temperature polysilicon TFT (Thin Film Transistor) panels and reflection type liquid crystal panels (e.g., liquid crystal on silicon (LCoS)) can be used. Since the single plate type or three-plate type projectors equipped with liquid crystal panels have been well known, description of the configurations is omitted.

Further, in order to provide a clear description of the operation and effect, the present exemplary embodiment was described by giving examples using a full-HD supporting panel having a pixel size of "□10.8 µm" and a 4K-compatible panel having a pixel size of "□5.4 µm". However, the application examples of the present invention are not limited to this. The present invention can be applied to panels of various resolutions such as WXGA, etc.

In the present exemplary embodiment, as projection lens 109, use is made of a lens having an MTF value that is less than 50% of the spatial frequency of DMD 108 and that is equal to or greater than 50% of the spatial frequency that is determined by the size of the pixel of the image formed in a time-divisional manner. Here, "50%" is the threshold based on the condition generally imposed on the MTF value. However, some manufactures may apply 60% to this threshold. Accordingly, in the present invention, the threshold may and should be set so as not to cause any insufficient resolution, preferably set at "50%" or more preferably "60%".

Further, in the present exemplary embodiment, display control unit 1 generates, from input video signal S1, multiple image signals that represent multiple images to be formed in a time-divisional manner, respectively. However, the present invention should not be limited to this. For example, multiple image signals that represent multiple images to be formed in a time-divisional manner, respectively, may be supplied from an external device to display control unit 1.

The present invention can take the modes described in the following SUPPLEMENTARY NOTES 1 to 14, but should not be limited to these modes.

[SUPPLEMENTARY NOTE 1]

A projector comprising:

a light source;

image forming means that includes a pixel area which is configured of a plurality of pixels, the plurality of pixels modulating light that is emitted from the light source based on an input video signal to form an image;

projecting means that projects the image that is formed by the image forming means; and control means that controls an image forming operation of the image forming means, wherein the control means forms a frame image by sequentially forming a plurality of images in which a combined pixel which is configured of a plurality of pixels is used as a pixel unit, and wherein, with respect to temporally continuous two images from among the plurality of images, the control means forms one image at a position that is shifted by a distance that corresponds to a pixel pitch of the pixel area in a predetermined direction relative to the other image.

[SUPPLEMENTARY NOTE 2]

The projector according to SUPPLEMENTARY NOTE 1, wherein the combined pixel is four pixels arranged in two rows and two columns, and the predetermined direction is a row direction and a column direction.

[SUPPLEMENTARY NOTE 3]

The projector according to SUPPLEMENTARY NOTE 1 or 2, wherein the projecting means includes a projection lens having an MTF value, the MTF value being less than a predetermined value relative to a spatial frequency that is determined by a size of the pixel of the pixel area and being equal to or greater than the predetermined value relative to a spatial frequency that is determined by a size of the combined pixel.

[SUPPLEMENTARY NOTE 4]

The projector according to SUPPLEMENTARY NOTE 3, wherein the predetermined value is 50%.

[SUPPLEMENTARY NOTE 5] The projector according to any one of SUPPLEMENTARY NOTES 1 to 4, wherein a part of the pixel area includes a black display area for displaying black.

[SUPPLEMENTARY NOTE 6] The projector according to SUPPLEMENTARY NOTE 5, wherein the control means forms the frame image in the area other than the black display area in the pixel area.

[SUPPLEMENTARY NOTE 7] The projector according to any one of SUPPLEMENTARY NOTES 1 to 6, wherein:

the input video signal is a signal that represents an image having the same pixel count as the pixel area;

the control means generates, from the input video signal, a plurality of image signals that represent the plurality of images, respectively; and the image forming means forms the plurality of images in a time-divisional manner based on the plurality of image signals.

[SUPPLEMENTARY NOTE 8] An image displaying method implemented in a projector that includes a display panel, that forms an image by modulating light emitted from a light source based on an input video signal, and that projects an image that is formed by the display panel to a projected surface, the image displaying method comprising:

displaying a frame image by sequentially forming, by the display panel, a plurality of images in which a combined pixel which is configured of a plurality of pixels is used as a pixel unit; and with respect to temporally continuous two images from among the plurality of images, forming one image at a position that is shifted by a distance that corresponds to a pixel pitch of the display panel in a predetermined direction relative to the other image.

[SUPPLEMENTARY NOTE 9] The image displaying method according to SUPPLEMENTARY NOTE 8, wherein the combined pixel is four pixels that are arranged in two rows and two columns, and the predetermined direction is a row direction and a column direction.

[SUPPLEMENTARY NOTE 10] The image displaying method according to SUPPLEMENTARY NOTE 8 or 9, further comprising using a projection lens having an MTF value to project the image that is formed by the display panel, the MTF value being less than a predetermined value relative to a spatial frequency that is determined by a size of the pixel of the display panel and being equal to or greater than the predetermined value relative to a spatial frequency that is determined by a size of the combined pixel.

[SUPPLEMENTARY NOTE 11] The image displaying method according to SUPPLEMENTARY NOTE 10, wherein the predetermined value is 50%.

[SUPPLEMENTARY NOTE 12] The image displaying method according to any one of SUPPLEMENTARY NOTES 8 to 11, wherein the display panel has a pixel area, a part of the pixel area being formed by a black display area for displaying black, and the frame image is formed in an area other than the black display area in the pixel area.

[SUPPLEMENTARY NOTE 13] The image displaying method according to any one of SUPPLEMENTARY NOTES 8 to 11, wherein the display panel has a pixel area, a part of the pixel area being formed by a black display area for displaying black, and the frame image is formed in an area other than the black display area in the pixel area.

[SUPPLEMENTARY NOTE 14] The image displaying method according to any one of SUPPLEMENTARY NOTES 8 to 13, wherein the input video signal is a signal that represents an image having the same pixel count as the pixel area, the image displaying method further comprising:

generating, from the input video signal, a plurality of image signals that represent the plurality of images, respectively; and causing the display panel to form the plurality of images in a time-divisional manner based on the plurality of image signals.

In the projectors described in the above SUPPLEMENTARY NOTES 1 to 7, the control means corresponds to display control unit 1 and the image forming means corresponds to DMD 108, panel driver 2 and the like. The projecting means includes projection lens 109.

According to the above projectors, even if a projection lens having an MTF value of less than 50% of the spatial frequency determined by the size of the pixel of the pixel area is used, deterioration in image quality due to insufficient resolution will not occur as long as the MTF value of the projection lens is equal to or greater than 50% of the spatial frequency determined by the size of the combined pixel.

Besides, since the frame image is formed in pixel units, it is possible to provide projection images having a pixel count equivalent to that of the pixel area.

The image displaying methods of the SUPPLEMENTARY NOTES 8 to 14 can also provide the same effect as the above projectors.

The invention claimed is:

1. A projector comprising:
a light source;
an image forming unit that includes a pixel area which is configured of a plurality of pixels, the plurality of pixels modulating light that is emitted from the light source based on an input video signal to form an image;
a projection lens that projects the image that is formed by the image forming unit; and a control unit that controls an image forming operation of the image forming unit, wherein the control unit forms a frame image by sequentially forming a plurality of images in which a combined pixel which is configured of a plurality of pixels is used as a pixel unit, wherein, with respect to temporally continuous two images from among the plurality of images, the control unit forms one image at a position that is shifted by a distance that corresponds to a pixel pitch of the pixel area in a predetermined direction relative to the other image, and wherein the projection lens has a Modulation Transfer Function (MTF) value, the MTF value being less than a predetermined value relative to a spatial frequency that is determined by a size of the pixel of the pixel area and being equal to or greater than the predetermined value relative to spatial frequency that is determined by a size of the combined pixel.

2. The projector according to claim 1, wherein the combined pixel is four pixels arranged in two rows and two columns, and the predetermined direction is a row direction and a column direction.

3. The projector according to claim 1, wherein the predetermined value is 50%.

4. The projector according to claim 1, wherein a part of the pixel area includes a black display area for displaying black.

5. The projector according to claim 4, wherein the control unit forms the frame image in the area other than the black display area in the pixel area.

6. The projector according to claim 1, wherein:
the input video signal comprises a signal that represents an image having the same pixel count as the pixel area;
the control unit generates, from the input video signal, a plurality of image signals that represent the plurality of images, respectively; and
the image forming unit forms the plurality of images in a time-divisional manner based on the plurality of image signals.

7. An image displaying method implemented in a projector that includes a display panel, that forms an image by modulating light emitted from a light source based on an input video signal, and that projects an image that is formed by the display panel to a projected surface, the image displaying method comprising:

displaying a frame image by sequentially forming, by the display panel, a plurality of images in which a combined pixel which is configured of a plurality of pixels is used as a pixel unit; and with respect to temporally continuous two images from among the plurality of images, forming one image at a position that is shifted by a distance that corresponds to a pixel pitch of the display panel in a predetermined direction relative to the other image, the method further comprising using a projection lens having a Modulation Transfer Function (MTF) value to project the image that is formed by the display panel, the MTF value being less than a predetermined value relative to spatial frequency that is determined by a size of the pixel of the display panel and being equal to or greater than the predetermined value relative to a spatial frequency that is determined by a size of the combined pixel.

8. The image displaying method according to claim 7, wherein the combined pixel is four pixels that are arranged in two rows and two columns, and the predetermined direction is a row direction and a column direction.

9. The image displaying method according to claim 7, wherein the predetermined value is 50%.

10. The image displaying method according to claim 7, wherein the display panel has a pixel area, a part of the pixel area being formed by a black display area for displaying black, and the frame image is formed in the entire pixel area.

11. The image displaying method according to claim 7, wherein the display panel has a pixel area, a part of the pixel area being formed by a black display area for displaying black, and the frame image is formed in an area other than the black display area in the pixel area.

12. The image displaying method according to claim 7, wherein the input video signal comprises a signal that represents an image having the same pixel count as the pixel area, the image displaying method further comprising:
generating, from the input video signal, a plurality of image signals that represent the plurality of images, respectively; and
causing the display panel to form the plurality of images in a time-divisional manner based on the plurality of image signals.

* * * * *